G. P. LAW.
GAS ENGINE.
APPLICATION FILED MAR. 16, 1910.
972,547.
Patented Oct. 11, 1910.
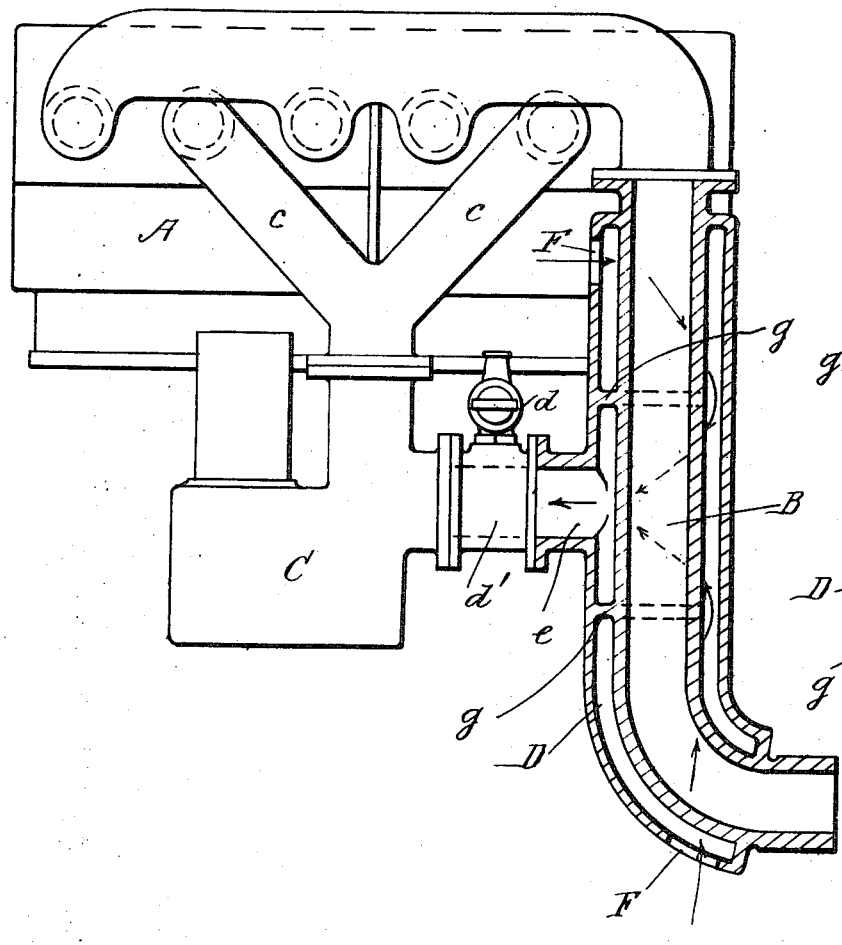
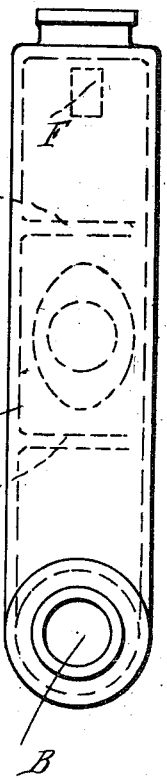
Witnesses
Chas M Baruch
L. H. Schmidt
Inventor
George P. Law
By Herbert W. Jenner
Attorney

UNITED STATES PATENT OFFICE.

GEORGE P. LAW, OF LANSING, MICHIGAN.

GAS-ENGINE.

972,547.  Specification of Letters Patent.  Patented Oct. 11, 1910.

Application filed March 16, 1910. Serial No. 549,767.

*To all whom it may concern:*

Be it known that I, GEORGE P. LAW, a citizen of the United States, residing at Lansing, in the county of Ingham and State of Michigan, have invented certain new and useful Improvements in Gas-Engines; and I do hereby declare the following to be a full, clear, and exact description of the invention, such as will enable others skilled in the art to which it appertains to make and use the same.

This invention relates to gas engines; and it consists in the novel construction and combination of the parts hereinafter fully described and claimed whereby the air to support combustion in the engine cylinder is heated by means of the waste heat from the exhaust-pipe before it enters the carbureter.

In the drawings, Figure 1 is a plan view of portions of a gas engine provided with an air-inlet pipe and an exhaust-pipe according to this invention. Fig. 2 is a side view of the air-inlet pipe.

A is the power cylinder of a gas engine of any approved construction, and B is an exhaust-pipe which may be connected to any number of power cylinders. This exhaust-pipe is heated by the waste products of combustion which are expelled through it.

C is a carbureter of any approved construction which is operatively connected with the cylinder or cylinders by a pipe or pipes $c$.

D is the air-inlet pipe which is connected to the carbureter C, and $d$ is a small plug-valve for the admission of cold air secured to a junction-piece $d'$ arranged between the air-inlet pipe and the carbureter. The air-inlet pipe is secured around the exhaust-pipe, and is connected to the carbureter at about the middle of the length of the air-inlet pipe by a branch $e$.

F are holes for the air to enter at the end portions of the air-inlet pipe and on the same side thereof as the branch $e$. Partitions $g$ are arranged between the pipes B and D, and extend circumferentially partway around the pipe B. These partitions are arranged on the same side of the air-inlet pipe as the holes F and the branch $e$. The air passes spirally around the exhaust-pipe in the direction of the arrows in the drawings, and is heated by contact with the exhaust-pipe so that it does more effective work in the carbureter and engine cylinder. The small plug-valve $d$ can be opened more or less as required, by hand, to admit cold air, when the air in the air-inlet pipe is heated by the exhaust-pipe to an undesirably high temperature.

What I claim is:

1. The combination, with the exhaust-pipe and the carbureter of a gas engine; of an air-inlet pipe which encircles the said exhaust-pipe and which is provided at its middle part with a branch for connecting it to the carbureter, said air-inlet pipe having air-inlet holes in its end portions on the same side as the said branch and having also circumferentially arranged partitions extending partway around it between the said air-inlet holes and branch, air passages being formed between the said partitions and pipes on the opposite side of the air-inlet pipe from its air-holes and outlet branch, whereby the air is caused to flow longitudinally and spirally in contact with the exhaust pipe from each end of the air-inlet pipe.

2. The combination, with the exhaust-pipe and the carbureter of a gas engine; of an air-inlet pipe which encircles the said exhaust-pipe and which has its middle portion connected to the said carbureter, said air-inlet pipe having air-inlet holes at its end portions, and a valve for admitting cold air arranged at the junction of the air-inlet pipe with the carbureter.

In testimony whereof I have affixed my signature in the presence of two witnesses.

GEORGE P. LAW.

Witnesses:
ROBERT W. KOLLER,
EDWIN H. PORTER.